United States Patent [19]

Willey et al.

[11] Patent Number: 5,470,510
[45] Date of Patent: Nov. 28, 1995

[54] DISPERSING AGENT

[75] Inventors: Alan D. Willey, Sandyford; Robin G. Hall, Curdworth, both of Great Britain

[73] Assignee: The Procter & Gamble Company, Cincinnati, Ohio

[21] Appl. No.: 211,189
[22] PCT Filed: Sep. 21, 1992
[86] PCT No.: PCT/US92/08050
    § 371 Date: Mar. 23, 1994
    § 102(e) Date: Mar. 23, 1994
[87] PCT Pub. No.: WO93/06202
    PCT Pub. Date: Apr. 1, 1993

[30] Foreign Application Priority Data

Sep. 27, 1991 [GB] United Kingdom ............... 9120653

[51] Int. Cl.$^6$ ................... C11D 3/26; C11D 7/32
[52] U.S. Cl. ............... 252/546; 252/174.23; 252/174.21
[58] Field of Search ............... 252/546, 174.23, 252/174.21

[56] References Cited

U.S. PATENT DOCUMENTS

| | | | |
|---|---|---|---|
| 5,066,425 | 11/1991 | Ofosu-Asante et al. | 252/174 |
| 5,183,601 | 2/1993 | Jisai et al. | 252/524 |
| 5,318,719 | 7/1994 | Hughes et al. | 252/174.23 |
| 5,328,631 | 7/1994 | Du Vosel et al. | 252/174.23 |

FOREIGN PATENT DOCUMENTS

| | | | |
|---|---|---|---|
| 0454126 | 10/1991 | European Pat. Off. | C11D 3/37 |
| 1806502 | 5/1970 | Germany. | |
| 3724460 | 2/1988 | Germany. | |

Primary Examiner—Linda Skaling Therkorn
Assistant Examiner—Patricia L. Hailey
Attorney, Agent, or Firm—J. C. Rasser; K. W. Zerby; M. D. Jones

[57] ABSTRACT

Poly(glutamic acid) is used as a dispersing, soil-suspending or anti-redeposition agent in laundry detergent or other cleaning compositions that also contain a detersive surfactant. Suitable polymers include not only the homopolymers of glutamic acid but also block, graft or random copolymers of glutamic acid with biodegradable monomers or polymers, e.g., other amino acids or polyethylene glycol.

3 Claims, No Drawings

DISPERSING AGENT

FIELD OF THE INVENTION

The present invention relates to the use of polymers of glutamic acid as dispersing agents, especially in cleaning compositions, for example in laundry detergent compositions.

BACKGROUND OF THE INVENTION

Polyacrylates and acrylate/maleate copolymers are widely used as dispersing agents, specifically as soil-suspending and/or anti-redeposition agents, in detergent compositions and confer important cleaning benefits thereon. However, these polymers and copolymers are not easily biodegradable, thereby posing potential environmental problems. Carboxymethyl cellulose is biodegradable at a degree of substitution (DS) of less than 0.7 but, although it confers some whiteness-maintenance benefit to detergent compositions, it is deficient with regard to soil-suspension properties. Accordingly, there is a need in the art for effective agents that will undergo rapid and substantially complete biodegradation; furthermore, it would be advantageous if such agents were to be derived from natural starting materials. EP-A-454126 discloses detergent formulations comprising from 5% to 50% by weight of polyaminoacid derived from glutamic acid. (Published Oct. 30, 1991).

SUMMARY OF INVENTION

The present invention relates to the use of dispersing agent, especially in a cleaning composition, of a polymer of glutamic acid, wherein the polymer of glutamic acid is present at a level of from 0.1% to 4.95% by weight of the composition. In one aspect, the present invention provides a cleaning composition (a) from 0.1% to 4.95% by weight of a polymer of glutamic acid and (b) a detersive surfactant, preferably selected from nonionic, anionic, cationic, ampholytic and zwitterionci detersive surfactants.

DESCRIPTION OF EXEMPLARY EMBODIMENTS

The polymers suitable as component (a) may be derived from L-glumatic acid, D-glumatic acid or mixtures, e.g. racemates, of these L and D isomers. The L isomer and D, L racemate are currently preferred. The polymers suitable as component (a) in the present compositions include not only the homopolymers of glutamic acid but also copolymers, such as block, graft or random copolymers, containing glutamic acid. Thus, copolymers of glutamic acid with at least one other (preferably biodegradable) monomer, oligomer or polymer come into consideration. These include, for example, copolymers containing at least one other amino acid, such as aspartic acid, ethylene glycol, ethylene oxide, (or an oligimer or polymer of any of these) or polyvinyl alcohol.

Glutamic acid may, of course, carry one or more substituents and the polymers useful as component (a) include those in which a proportion or all of the glutamic acid monomers are substituted. Substituents include, for example, alkyl, hydroxy alkyl, aryl and arylalkyl, commonly with up to 18 carbon atoms per group, or polyethylene glycol attached by ester linkages.

The expression "poly (glutamic acid)" and cognate expressions herein are to be constructed as covering any of the aforesaid possibilities unless the context otherwise demands.

A homopolymer of glutamic acid may be prepared in a two-step process, in which (i) glutamic acid is treated with phosgene or an equivalent reagent, e.g. diphosgene, at a temperature of from 15° to 70° to form an N-carboxyanhydride (NCA), and (ii) ring-opening polymerisation of the N-carboxyanhydride is effected with a base to yield poly-(glutamic acid). Suitable bases include alkoxides, e.g. alkali metal alkoxides such as sodium mothoxide, organometallic compounds and primary, secondary or tertiary amines, for example butylamine or triethylamine. Such bases are readily available or easily synthesised by methods known in the art, as are glumatic acid and (di) phosgene.

Although no representation as to the actual reaction mechanism is made herein, the aforesaid synthesis may be illustrated by the following reaction scheme:

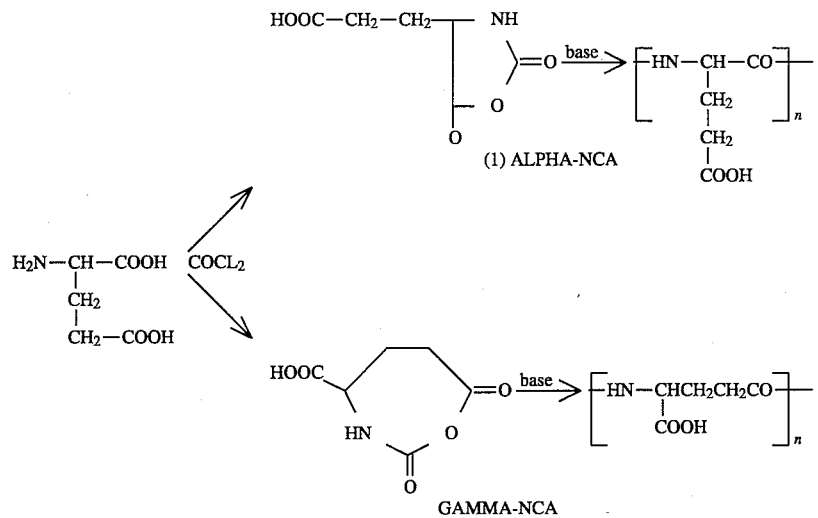

It will be noted that the pathways lead, respectively, to an alpha (a) form of a gamma (r) from of the glutamic acid polymer. The present invention includes both forms and mixtures thereof. Furthermore, although the pendant carboxylate groups are shown in the acid form (—COOH), the invention also extends to polymers wherein some or all of such groups are in a salt form, for instance a metal (e.g. sodium), ammonium or quaternary ammonium salt.

The aforesaid synthesis via the N-carboxyanhydride may be carried out under conditions mild enough to ensure that the resultant polymer retains the stereochemistry of the starting material. Thus, for example, it is possible to obtain from L-glutamic acid a polymer that contains only L-amino acid units.

The present invention is not, however, limited to polymers of glutamic acid that are made by the aforesaid synthesis route. Thus, for example, the bacterial production of poly (glumatic acid) also comes into consideration herein. Bacterial production of poly (glutamic acid) is described, for example in EP-A-410, 638 (Takeda). Bacterial synthetic processes will commonly yield poly (L-glutamic acid) although bacteria are known that will provide the D-form. Polymers of glutamic acid may also be prepared by thermal polycondensation of the nonomers: this usually yields a polymer of the D, L racemate.

A block copolymer of glutamic acid and polyethylene glycol may be prepared by the ring-opening polymerisation of the N-carboxyanhydride of glutamic acid using polyethylene glycol diamine (obtainable as "Jeffamine 4000") whilst preventing salt formation at the amine chain ends by carrying out the reaction in the presence of a non-nucleophilic base. In place of the said diamine, it is also possible to use, for example, polyethylene glycol which has been treated to terminal alkoxide groups.

The molecular weight of the glutamic acid polymers and copolymers will be typically from 1000 to 100,000, e.g. 3,000 to 7,000 although neither lower nor higher molecular weights are precluded herein. Molecular weights may be measured by gel permeation chromatography with differential iscometer detector. Illustrative reaction schemes for the preparation of copolymers include the following:

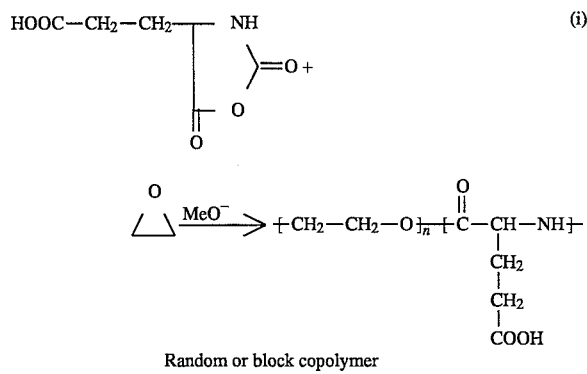

Random or block copolymer

The above example demonstrates how a random or, if the monomers were added sequentially, a diblock copolymer could be synthesised. The synthesis could be used with any anionically polymeriable monomer.

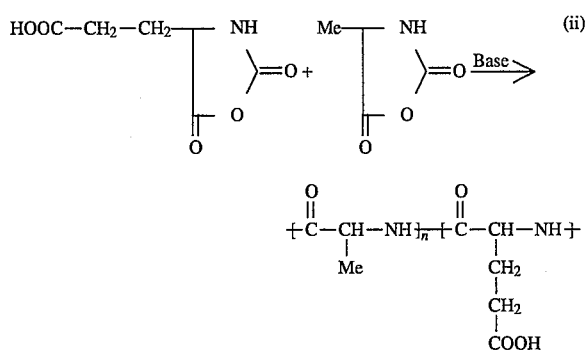

Alanine-NCA Random or block copolymer

The above demonstrates the copolymerisation of different amino acids from their respective NCA's and copolymerisation with a base as initiator. This too would give random or block copolymers depending upon how the addition of the respective monomers was carried out. Also this scheme are not limited to two monomers; more is possible.

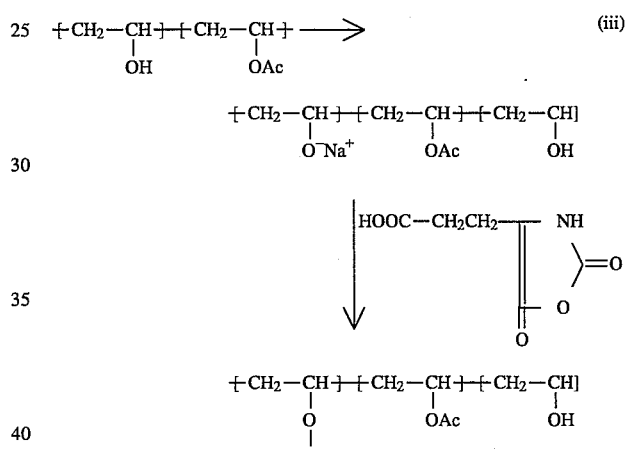

The above demonstrates the possibility that poly(glutamic acid) (PGA) could be grafted onto a suitable polymeric backbone. Poly (vinvy alcohol) is used as the backbone which is manufactured via the hydrolysis of poly (vinylacetate), hence it can be considered as a copolymer with —OH and —OAc sidechains. However the level of —OAc can be zero and is usually not more that 25%. This shows that a graft can be carried out on homopolymers or copolymers containing a suitable group (assuming that other groups in the copolymer do not interfere with polymerisation).

The poly (glutamic acid) may be used as a dispersing agent (which term herein includes a clay-soil suspending agent and or an anti-redeposition agent) in both liquid detergent compositions and solid (e.g. granular or other particulate) detergent compositions and are employed therein at a level from 0.1% to 4.95 percent, preferably 0.2 to 4.75 percent and more preferably 1 to 4.25 percent, by weight of the compositions.

The detersive surfactant (b) will typically be used in an amount of from 10 to 50 percent, preferably 1 to 30, more preferably 5 to 20 percent, by weight. Although the poly (glutamic acid) may be included in a wide variety of cleaning compositions, for example hard-surface and other household cleaners, dishwashing compositions and personal care products such as shampoos, soaps and toothpastes, the compositions of the present invention in certain preferred embodiments will be formulated as laundry detergent compositions, e.g. general-purpose or heavy-duty, liquid or granular laundry detergent compositions, that contain the poly (glumatic acid) dispersing agent and a detersive surfactant and, optionally, one or more further components conventional in the art, for example a detergent builder, a bleach (in particular a source of hydrogen peroxide, e.g. sodium perborate), a bleach activator an enzyme, a polymeric soil-release agent, a chelating agent, a conventional clay-soil removal-anti-redeposition agent, a polymeric dispersing agent, a brightener, a suds suppresor, a pH-buffering agent, a dye or a pigment.

It will be understood that any of the above mentioned components, whether essential or optional, may be constituted, if desired, by a mixture of two or more compounds of the appropriate description.

Examples of various detersive surfactants suitable for use as component (b) in the present composition are mentioned in the following description, which in turn is followed by examples of the various optional components that come into consideration for inclusion in the present compositions.

Nonionic Surfactants

The laundry detergent compositions of this invention may contain a nonionic surfactant.

Suitable nonionic surfactants include the polyethylene oxide condensates of alkly phenols, e.g., the condensation products of alkyl phenols having an alkyl group containing from 6 to 8 carbon atoms, in either a straight-chain or branched-chain configuration, with from 1 to 12 moles of ethylene oxide per mole of alkyl phenol.

Suitable nonionics also include the condensation products of aliphatic alcohols containing from 8 to 22, preferably 12 to 18, carbon atoms, in either straight-chain or branched-configuration, with from 2 to 12, preferably 3 to 7, moles of ethylene oxide per mole of alcohol.

Suitable nonionic surfactants also include the fatty acyl or alkyl condensation products of carbohydrates and their derivatives such as glycosides, aminodeoxy forms, and polyols. Examples include coco-alkyl polyglucosides and tallow-acyl polyglycerides. The nonionic surfactants may typically be used in an amount from 0.5 to 20%, preferably from 3 to 15% and more preferably from 5 to 10%, by weight of the total composition.

Anionic Surfactants

The detergent compositions of the previous invention can contain, in addition to the nonionic surfactant system of the present invention, one or more anionic surfactants as described below.

Alkyl Ester Sulfonate Surfactant

Alkyl ester sulfonate surfactants hereof include linear esters of $C_8$–$C_{20}$ carboxylic acids (i.e., fatty acids) which are sulfonated with gaseous $SO_3$ according to "The Journal of the American Oil Chemists Society", 52 (1975), pp 323–329. Suitable starting materials would include natural fatty substances as derived from tallow, palm oil, etc.

The preferred alkyl ester sulfonate surfactant, especially for laundry application, comprise alkyl ester sulfonate surfactants of the structural formula:

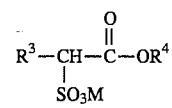

wherein $R^3$ is a $C_8$–$C_{20}$ hydrocarbyl, preferably an alkyl, or combination thereof, $R_4$ is a $C_1$–$C_6$ hydrocarbyl, preferably an alkyl, or combination thereof, and M is a cation which forms a water soluble salt with alkl ester sulfonate. Suitable salt-forming cations include metals such as sodium, potassium, and lithium, and substituted or unsubstituted ammonium cations, such as monoethanolamine, diethanolamine, and triethanolamine. Preferably, $R^3$ is $C_{10}$–$C_{16}$ alkyl and $R^4$ is methyl, ethyl or isopropyl. Especially preferred are the methyl ester sulfonates wherein $R^3$ is $C_{10}$–$C_{16}$ alkyl.

Alkyl Sulfonate Surfactant

Alkyl sulfate surfactants hereof are water soluble salts or acids of the formula $ROSO_3M$ wherein R preferably is a $C_{10}$–$C_{24}$ hydrocarbyl, preferably an alkyl or hydroxyalkyl having a $C_{10}$–$C_{20}$ alkyl component, more preferably a $C_{12}$–$C_{18}$ alkyl or hydroxyalkyl, and M is H or a cation, e.g. an alkali metal cation (e.g., sodium, potassium, lithium), or ammonium or substituted ammonium (e.g., methyl-, dimethly-, and trimethyl ammonium cations and quaternary ammonium cations such as tetramethlyammonium and dimethyl piperdinium cations and quaternary ammonium cations derived from alkylamines such as ethylamine, diethylamine, triethylamine, and mixtures thereof, and the like).

Alkyl chains 12–16 carbon atoms, more preferably 14–15 carbon atoms are preferred.

Alkyl Alkoxylated Sulfate Surfactants

Alkyl alkoxylated sulfate surfactants hereof are water soluble salts or acids of the formula $RO(A)_mSO_3^M$ wherein R is an unsubstituted $C_{10}$–$C_{24}$ alkyl or hydroxyalkyl group having a $C_{10}$–$C_{24}$ alkyl component, preferably a $C_{12}$–$C_{20}$ alkyl or hydroxyalkyl, more preferably an alkyl group having from 12 to 18 carbon atoms, especially from 12 to 15 carbon atoms. A is an ethoxy or propoxy unit, m is greater than zero, typically between about 0.5 and about 6, more preferably between 0.5 and about 3, and M is H or a cation which can be, for example, a metal cation (e.g., sodium, potassium, lithium, calcium, magnesium, etc.), ammonium or substituted ammonium cation. Alkyl ethoxylated sulfates as well as alkyl propoxylated sulfates are contemplated herein. Specific examples of substituted ammonium cations include methyl-, dimethyl-, trimethyl-ammonium cations and quaternary ammonium cations such as tetramethyl-ammonium and dimethyl piperdinium cations and those derived from alkylamines such as ethylamine, diethylamine, triethylamine, mixtures thereof, and the like. A preferred surfactant is $C_{12}$–$C_{15}$ alkyl polyethoxylate (3.0) sulfate ($C_{12}$–$C_{15}$E(3.0)M). Other exemplary surfactants include $C_{12}$–$C_{18}$ alkyl polyethoxylate (1.0) sulfate ($C_{12}$–$C_{18}$E(1.0)MO, $C_{12}$–$C_{18}$ alkyl polyethoxylate (2.25) sulfate ($C_{12}$–$C_{18}$E(2.25)M), $C_{12}$–$C_{18}$ alkyl polyethoxylate (3.0) sulfate ($C_{12}$–$C_{18}$E(3.0)M), and $C_{12}$–$C_{18}$ alkyl polyethoxylate (4.0) sulfate ($C_{12}$–$C_{18}$E(4.0)M), wherein M is conveniently selected from sodium and potassium.

Other Anionic Surfactants

Other anionic surfactants useful for detersive purposes can also be included in the compositions hereof. These can include sales (including, for example, sodium, potassium, ammonium, and substituted ammonium salts such as mono-, di- and triethanolamine salts) of soap, $C_9$–$C_{20}$ linear alkylbenzenesulphonates, $C_8$–$C_{22}$ primary or secondary alkanesulphonates, $C_8$–$C_{24}$ olefinsulphonates, sulphonated polycarboxylic acids prepared by sulphonation of the pyrolyzed product of alkaline earth metal citrates, e.g., as described in British patent specification No. 1,082,179, alkyl glycerol sulfonates, fatty acyl glycerol sulfonates, fatty oleyl glycerol sulfates, alkyl phenol ethylene oxide ether sulfates, paraffin sulfonates, alkyl phosphates, isethionates such as the acyl isethionates, N-acyl tautares, fatty acid amides of methyl tauride, alkyl succinamates and sulfosuccinates, monoesters of sulfosuccinate (especially saturated and unsaturated $C_{12}$–$C_{18}$ monoesters) diesters of sulfosuccinate (especially saturated and unsaturated $C_6$–$C_{14}$ diesters), N-acyl sarcosinates, sulfates of alkylpolysaccharides such as the sulfates of alkylpolyglucoside (the nonionic nonsulfated compounds being described below), branched primary alkyl sulfates, alkyl polyethoxy carboxylates such as those of the formula $RO(CH_2CH_2O)_kCH_2COO$—$M^+$ wherein R is a $C_8$–$C_{22}$ alkyl, k is an integer from 0 to 10, and M is a soluble salt-forming cation, and fatty acids esterified with isethionic acid and neutralized with sodium hydroxide. Resin acids and hydrogenated resin acids are also suitable, such as rosin, hydrogenated rosin, and resin acids and hydrogenated resin acids present in or derived from tall oil. Further examples are given in "Surface Active Agents and Detergents" (Vol. I and II by Schwartz, Perry and Berch). A variety of such surfactants are also generally disclosed in U.S. Pat. No. 3,929,678, issued Dec. 30, 1975 to Laughlin, et al. at Column 23, line 58 through Column 29, line 23 (herein incorporated by reference).

Preffered anionic surfactants systems employed in the detergent compositions of the invention are free of alkyl benzene sulfonate salts. A highly preferred system comprises a mixture of a major proportion of a $C_{14}$–$C_{15}$ primary alkyl sulfate and a minor proportion of a $C_{12}$–$C_{15}$ alkyl ethoxysulfate containing an average of three ethoxy groups per mole of alkyl ethoxy sulfate. The laundry detergent compositions of the present invention typically comprise from about 1% to about 20%, preferably from about 3% to about 15% and most preferably from 5% to 10% by weight of anionic surfactants.

Other Surfactants

The detergent compositions of the present invention may also contain cationic, ampholytic, zwitterionic, and semi-polar surfactants.

Cationic detersive surfactants suitable for use in the detergent compositions of the present invention are those having one long-chain hydrocarbyl group. Examples of such cationic surfactants include the ammonium surfactants such as alkyldimethylanium halogenides, and those surfactants having the formula:

$$(R^2(OR^3)_y)(R^4(OR^3)_y)_2R^5N+X^-$$

wherein $R^2$ is an alkyl or alkyl benzyl group having from about 8 to about 18 carbon atoms in the alkyl chain, each $R^3$ is selected from the group consisting of —$CH_2CH_2$—, —$CH_2CH(CH_3)$—, —$CH_2CH(CH_2OH)$—, —$CH_2CH_2CH_2$—, and mixtures thereof; each $R^4$ is selected from the group consisting of $C_1$–$C_4$ alkyl, $C_1$–$C_4$ hydroxyalkyl, benzyl ring structures formed by joining the two $R^4$ groups, 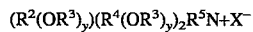

wherein $R^6$ is any hexose or hexose polymer having a molecular weight less than about 1000, and hydrogen when y is not 0; $R^5$ is the same as $R^4$ or is an alkyl chain wherein the total number of carbon atoms of $R^2$ plus $R^5$ is not more than about 18; each y is from 0 to about 10 and the sum of the y values is from 0 to about 15; and X is any compatible anion.

Other cationic surfactants useful herein are also described in the U.S. Pat. No. 4,228,044, Cambre, issued Oct. 14, 1980, incorporated herein by reference. When included therein, the detergent compositions of the present invention typically comprise from 0% to about 25%, preferably from about 3% to about 15% by weight of such cationic surfactants.

Ampholytic surfactants are also suitable for use in the detergent compositions of the present invention. These surfactants can be broadly described as aliphatic derivatives of secondary or tertiary amines, or aliphatic derivatives of heterocyclic secondary and tertiary amines in which the aliphatic radical can be straight chain or branched. One of the aliphatic substituents contains at least about 8 carbon atoms, typically from about 8 to about 18 carbon atoms, and at least one contains an anionic water-solubilizing group, e.g., carboxy, sulfonate, sulfate. See U.S. Pat. No. 3,929,678 to Laughlin et al., issued Dec. 30, 1975 at column 19, lines 18–35 (herein incorporated by reference) for examples of ampholytic surfactants.

When included thereit, the detergent compositions of the present invention typically comprise from 0% to about 15%, preferably from about 1% to about 10% by weight of such ampholytic surfactants.

Zwitterionic surfactants are also suitable for use in detergent compositions . These surfactants can be broadly described as derivatives of secondary and tertiary amines, derivatives of heterocyclic secondary and tertiary amines, or derivatives of quaternary ammonium, quaternary phosphonium or tertiary sulfonium compounds. See U.S. Pat. No. 3,929,678 to Laughlin et al., issued Dec. 30, 1975 at column 19, line 38 through column 22, line 48 (herein incorporated by reference) for examples of zwitterionic surfactants. When included therein, the detergent compositions of the present invention typically comprise from 0% to about 15%, preferably from about 1% to about 10% by weight of such zwittarionic surfactants.

Semi-polar nonionic surfactants are a special category of nonionic surfactants which include water-soluble amine oxides containing one alkyl moiety of from about 10 to about 18 carbon atoms and 2 moieties selected from the group consisting of alkyl groups and hydroxyalkyl groups containing from about 1 to about 3 carbon atoms; water-soluble phosphine oxides containing one alkyl moiety of from about 10 to about 18 carbon atoms and 2 moieties selected from the group consisting of alkyl groups and hydroxyalkyl groups containing from about 1 to about 3 carbon atoms; and water-soluble sulfoxides containing one alkyl moiety of from about 10 to about 18 carbon atoms and a moiety selected from the group consisting of alkyl and hydroxyalkyl moieties of from about 1 to about 3 carbon atoms.

Semi-polar nonionic detergent surfactants include the amine oxide surfactants having the formula

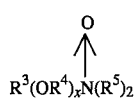

wherein $R^3$ is an alkyl, hydroxyalkyl, or alkyl phenyl group or mixtures thereof containing from about 8 to about 22 carbon atoms; $R^4$ is an alkylene or hydroxyalkylene group containing from about 2 to about 3 carbon atoms or mixtures thereof; x is from 0 to about 3; and each $R^5$ is an alkyl or hydroxyalkyl group containing from about 1 to about 3 carbon atoms or a polyethylene oxide group containing from about 1 to about 3 ethylene oxide groups. The $R^5$ groups can be attached to each other, e.g., through an oxygen or nitrogen atom, to form a ring structure.

These amine oxide surfactants in particular include $C_{10}$–$C_{18}$ alkyl dimethyl amine oxides and $C_8$–$C_{12}$ alkoxy ethyl dihydroxy ethyl amine oxides.

When included therein, the detergent compositions of the present invention typically comprise from 0% to about 15%, preferably from about 1% to about 10% by weight of such semi-polar nonionic surfactants.

Builders

The detergent compositions of the present invention can comprise inorganic or organic detergent builders to assist in mineral hardness control.

The level of the builder can vary widely depending upon the end use of the composition and its desired physical form. Liquid formulations typically comprise at least 1%, more typically from about 5% to about 50%, preferably about 5% to about 30%, by weight of detergent builder. Granular formulations typically comprise at least about 1%, more typically from about 10% to about 80%, preferably from about 15% to about 50% weight of the detergent builder. Lower or higher levels of builder, however, are not meant to be excluded.

Inorganic detergent builders include, but are not limited to, the alkali metal, ammonium and alkanolammonium salts of polyphosphates (exemplified by the tripolyphosphates, pyrophosphates, and glassy polymeric meta-phosphates), phosphonates, phytic acid, silicates, carbonates (including bicarbonates and sesquicarbonates), sulphates, and aluminosilicates. Borate builders, as well as builders containing borate-forming materials that can produce borate under detergent storage or wash conditions (hereinafter, collectively "borate builders"), can also be used but are not preferred at wash conditions less than about 50° C., especially less than about 40° C. Preferred builder systems are also free of phosphates. Examples of silicate builders are the alkali metal silicates, particularly those having a $SiO_2$:$Na_2O$ ratio in the range 1.6:1 to 3.2:1 and layered silicates, such as the layered sodium silicates described in U.S. Pat. No. 4,664,839, issued May 12, 1987 to H. P. Rieck, incorporated herein by reference. However, other silicates may also be useful such as for example magnesium silicate, which can serve as a crispening agent in granular formulations, as a stabilizing agent for oxygen bleaches, and as a component of suds control systems.

Examples of carbonate builders are the alkaline earth and alkali metal carbonates, including sodium carbonate and sesquicarbonate and mixtures thereof with ultra-fine calcium carbonate as disclosed in German Patent Application No. 2,321,001 published on Nov. 15, 1973, the disclosure of which is incorporated herein by reference.

Aluminosilicate builders are useful in the present invention. Aluminosilicate builders are of great importance in most currently marketed heavy duty granular detergent compositions, and can also be a significant builder ingredient in liquid detergent formulations. Aluminosilicate builders include those having the empirical formula:

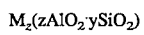

wherein M is sodium, potassium, ammonium or substituted ammonium, z is from about 0.5 to about 2; and y is 1; this material having a magnesium ion exchange capacity of at least about 50 milligram equivalents of $CaCO_3$ hardness per gram of anhydrous aluminosilicate. Preferred alumino-silicates are zeolite builders which have the formula:

$$Na_z[(AlO_2)_z(SiO_2)_y]\cdot xH_2O$$

wherein z and y are integers of at least 6, the molar ratio of z to y is in the range from 1.0 to about 0.5, and x is an integer from about 15 to about 264. Useful aluminosilicate ion exchange materials are commercially available. These aluminosilicates can be crystalline or amorphous in structure and can be naturally-occurring aluminosilicates or synthetically derived. A method for producing aluminosilicate ion exchange materials is disclosed in U.S. Pat. No. 3,985,669, Krummel, et al., issued Oct. 12, 1976, incorporated herein by reference. Preferred synthetic crystalline aluminosilicate ion exchange materials useful herein are available under the designations Zeolite A, Zeolite P (B), and Zeolite X. In an especially preferred embodiment, the crystalline aluminosilicate ion exchange material has the formula:

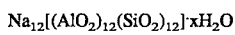

wherein x is from about 20 to about 30, especially about 27. This material is known as Zeolite A. Preferably, the aluminosilicate has a particle size of about 0.1–10 microns in diameter.

Specific examples of polyphosphates are the alkali metal tripolyphosphates, sodium, potassium and ammonium pyrophosphate, sodium and potassium and ammonium pyrophosphate, sodium and potassium orthophosphate, sodium polymeta phosphate in which the degree of polymerization ranges from about 6 to about 21, and salts of phytic acid.

Examples of phosphonate builder salts are the water-soluble salts of ethane 1-hydroxy-1, 1-diphosphonate particularly the sodium and potassium salts, the water-soluble salts of methylene diphosphonic acid e.g. the trisodium and tripotassium salts and the water-soluble salts of substituted methylene diphosphonic acids, such as the trisodium and tripotassium ethylidene, isopyropylidene benzylmethylidene and halo methylidene phosphonates. Phosphonate builder salts of the aforementioned types are disclosed in U.S. Pat. Nos. 3,159,581 and 3,213,030 issued Dec. 1, 1964 and Oct. 19, 1965, to Diehl; U.S. Pat. No. 3,422,021 issued Jan. 14, 1969, to Roy; and U.S. Pat. Nos. 3,400,148 and 3,422,137 issued Sep. 3, 1968, and Jan. 14, 1969 to Quimby, said disclosures being incorporated herein by reference.

Polycarboxylate builder can generally be added to the composition in acid form, but can also be added in the form of a neutralized salt. When utilized in salt form, alkali metals, such as sodium, potassium, and lithium, or alkanolammonium salts are preferred. Included among the polycarboxylate builders are a variety of categories of useful materials. One important category of polycarboxylate builders encompasses the ether polycarboxylates. A number of ether polycarboxylates have been disclosed for use as detergent builders. Examples of useful ether polycarboxylates include oxydisuccinate, as disclosed in Berg, U.S. Pat. No. 3,128,287, issued Apr. 7, 1964, and Lamberti et al., U.S. Pat. No. 3,635,830, issued Jan. 18, 1972, both of which are incorporated herein by reference.

A specific type of ether polycarboxylates useful as builders in the present invention also include those having the general formula:

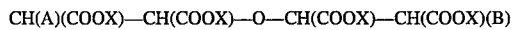

CH(A)(COOX)—CH(COOX)—O—CH(COOX)—CH(COOX)(B)

wherein A is H or OH; B is H or —O—CH(COOX)—CH$_2$(COOX); and X is H or a salt-forming cation. For example, if in the above general formula A and B are both H, then the compound is oxydissuccinic acid and its water-soluble salts. If A is OH and B is H, then the compound is tartrate monosuccinic acid (TMS) and its water-soluble salts. If A is H and B is —O—CH(COOX)CH$_2$(COOX), then the compound is tartrate disuccinic acid (TDS) and its water-soluble salts. Mixtures of these builders are especially preferred for use herein. Particularly preferred are mixtures of TMS and TDS in a weight ratio of TMS to TDS of from about 97:3 to about 20:80. These builders are disclosed in U.S. Pat. No. 4,663,071, issued to Bush et al., on May 5, 1987.

Suitable ether polycarboxylates also include cyclic compounds, particularly alicyclic compounds, such as those described in U.S. Pat. Nos. 3,923,679; 3,835,163; 4,158,635; 4,120,874 and 4,102,903, all of which are incorporated herein by reference.

Other useful detergency builders include the ether hydroxypolycarboxylates represented by the structure:

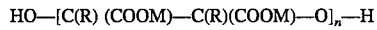

HO—[C(R) (COOM)—C(R)(COOM)—O]$_n$—H wherein M is hydrogen or a cation wherein the resultant salt is water-soluble, preferably an alkali metal, ammonium or substituted ammonium cation, n is from about 2 to about 15 (preferably n is from about 2 to about 10, more preferably n averages from about 2 to about 4) and each R is the same or different and selected from hydrogen, C$_{1-4}$ alkyl or C$_{1-4}$ substituted alkyl (preferably R is hydrogen).

Still other ether polycarboxylates include copolymers of maleic anhydride with ethylene or vinyl methyl ether, 1, 3, 5-trihydroxy benzene-2, 4, 6-trisulphonic acid, and carboxymethyloxysuccinic acid. Organic polycarboxylate builders also include the various alkali metal, ammonium and substituted ammonium salts of polyacetic acids. Examples include the sodium, potassium, lithium, ammonium and substituted ammonium salts of ethylenediamine tetraacetic acid, and nitrilotriacetic acid. Also included are polycarboxylates such as mellitic acid, succinic acid, oxydisuccinic acid, polymaleic acid, benzene 1,3,5-tricarboxylic acid, and carboxymethyloxysuccinic acid, and soluble salts thereof.

Citrate builders, e.g., citric acid and soluble salts thereof (particularly sodium salt), are polycarboxylate builders of particular importance for heavy duty liquid detergent formulations, but can also be used in granular compositions. Suitable salts include the metal salts such as sodium, lithium, and potassium salts, as well as ammonium and substituted ammonium salts.

Other carboxylate builders include the carboxylated carbohydrates disclosed in U.S. Pat. No. 3,723,322, Diehl, issued Mar. 28, 1973, incorporated herein by reference.

Also suitable in the detergent compositions of the present invention are the 3,3-dicarboxy-4-oxa-1,6-hexanedioates and the related compounds disclosed in U.S. Pat. No. 4,566,984, Bush, issued Jan. 28, 1986, incorporated herein by reference. Useful succinic acid builders include the C$_5$–C$_{20}$ alkyl succinic acids and salts thereof. A particularly preferred compound of this type is dodecenylsuccinic acid. Alkyl succinic acids typically are of the general formula R—CH(COOH)CH$_2$(COOH) i.e., derivatives of succinic acid, wherein R is hydrocarbon, e.g., C$_{10}$–C$_{20}$ alkyl or alkenyl, preferably C$_{12}$–C$_{16}$ or wherein R may be substituted with hydroxyl, sulfo, sulfoxy or sulfone substituents, all as described in the above-mentioned patents.

The succinate builders are preferably used in the form of their water-soluble salts, including the sodium, potassium, ammonium and alkanolammonium salts. Specific examples of succinate builders include: laurylsuccinate, myristylsuccinate, palmitylsuccinate, 2-dodecenylsuccinate (preferred), 2-pentadecenylsuccinate, and the like. Laurylsuccinates are the preferred builders of this group, and are described in European Patent Application 86200690.5/0,200,263, published Nov. 5, 1986. Examples of useful builders also include sodium and potassium carboxymethyloxymalonate, carboxymethyloxysuccinate, cis-cyclo-hexanehexacarboxylate, cis-cyclopentane-tetracarboxylate, water-soluble polyacrylates (these polyacrylates having molecular weights to above about 2,000 can also be effectively utilized as dispersants), and the copolymers of maleic anhydride with vinyl methyl ether or ethylene.

Other suitable polycarboxylates are the polyacetal carboxylates disclosed in U.S. Pat. No. 4,144,226, Crutchfield et al., issued Mar. 13, 1979, incorporated herein by reference. These polyacetal carboxylates can be prepared by bringing together, under polymerization conditions, an ester of glyoxylic acid and a polymerization initiator. The resulting polyacetal carboxylate ester is then attached to chemically stable end groups to stabilize the polyacetal carboxylate against rapid depolymerization in alkaline solution, converted to the corresponding salt, and added to a surfactant.

Polycarboxylate builders are also disclosed in U.S. Pat. No. 3,308,067, Diehl, issued Mar. 7, 1967, incorporated herein by reference. Such materials include the water-soluble salts of homo- and copolymers of aliphatic carboxylic acids such as maleic acid, iraconic acid, methylenemalonic acid, fumaric acid, aconitic acid, citraconic acid and methylenemalonic acid.

Other organic builders known in the art can also be used. For example, monocarboxylic acids, and soluble salts thereof, having long chain hydrocarbyls can be utilized. These would include materials generally referred to as "soaps." Chain lengths of C$_{10}$–C$_{20}$ are typically utilized. The hydrocarbyls can be saturated or unsaturated.

Enzymes

Detersive enzymes can be included in the detergent compositions of the present invention for a variety of reasons including removal of protein-based, carbohydrate-based, or triglyceride-based stains, for example, and prevention of refugee dye transfer. The enzymes to be incorporated include proteases, amylases, lipases, cellulases, and peroxidases, as well as mixtures thereof. They may be of any suitable origin, such as vegetable, animal, bacterial, fungal and yeast origin. However, their choice is governed by several factors such as pH-activity and/or stability optima, thermostability, stability versus active detergents, builders and so on. In this respect bacterial or fungal enzymes are preferred, such as bacterial amylases and proteases, and fungal cellulases.

Suitable examples of proteases are the subtilisins which are obtained from particular strains of B.subtilis and B.licheniforms. Another suitable protease is obtained from a strain of Bacillus, having maximum activity throughout the pH range of 8–12, developed and sold by Novo Industries A/S under the registered trade name Esperase@. The preparation of this enzyme and analogous enzymes is described in British patent specification. No. 1,243,784 of Novo. Proteolytic enzymes suitable for removing protein-based stains that are commercially available include those sold under the tradenames ALCALASE™ and SAVINASE™ by Novo Industries A/S (Denmark) and MAXATASE™ by International Bio-Synthetics, Inc. (The Netherlands).

Of interest in the category of proteolytic enzymes, especially for liquid detergent compositions, are enzymes referred to herein as Protease A and Protease B. Protease A and methods for its preparation are described in European Patent Application 130,756, published Jan. 9, 1985, incorporated herein by reference. Protease B is a proteolytic enzyme which differs from Protease A in that it has a leucine substituted for tyrosine in position 217 in its amino acid sequence. Protease B is described in European Patent Application Serial No. 87303761.8, filed Apr. 28, 1987, incorporated herein by reference. Methods for preparation of Protease B are also disclosed in European Patent Application 130,756, Bott et al., published Jan. 9, 1985, incorporated herein by reference.

Amylases include, for example, a-amylases obtained from a special strain of B.licheniforms, described in more detail in British patent specification No. 1,296,839 (Novo), previously incorporated herein by reference. Amylolytic proteins include, for example RAPIDASE™, International Bio-Synthetics, Inc and TERMAMYL™, Novo Industries.

The cellulases usable in the present invention include both bacterial or fungal cellulase. Preferably, they will have a pH optimum of between 5 and 9.5. Suitable cellulases are disclosed in U.S. Pat. No. 4,435,307, Barbesgoard et al., issued Mar. 6, 1984, incorporated herein by reference, which discloses fungal cellulase produced from Humicola insolens. Suitable cellulases are also disclosed in GB-A-2.075.028; GB-A-2.095.275 and DE-OS-2.247.832.

Examples of such cellulases are cellulases produced by a strain of Humicola insolens (Humicola grisea var. thermoidea), particularly the Humicola strain DSM 1800, and cellulases produced by a fungas of Bacillus N or a cellulase 212-producing fungas belonging to the genus Aeromonas, and cellulase extracted from the hepatopancreas of a marine mollusc (Dolabella Auricula Solander).

Suitable lipass enzymes for detergent usage include those produced by micro-organisms of the of the Pseudomonas groups, such as *Pseudomonas stutzeri* ATCC 19.154, as disclosed in British Patent 1,372,034, incorporated herein by reference. Suitable lipases include those which show a positive immunological cross-reaction with the antibody of the lipase produced by the microorganism *Pseudomonas fluorescens* IAM 1057. This lipass and a method for its purification have been described in Japanese Patent Application 53-20487, laid open on Feb. 24, 1978. This lipase is available from Amano Pharmaceutical Co. Ltd., Nagoya, Japan, under the trade name Lipase P "Amano," hereinafter referred to as "Amano-P." Such lipases should show a positive immunological cross-reaction with the Amano-P antibody, using the standard and well-known immunodiffusion procedure according to Ouchterlony (Acta. Med. Scan., 133, pages 76–79 (1950)). These lipases, and a method for their immunological cross-reaction with Amano-P, are also described in U.S. Pat. No. 4,707,291, Thom et al., issued Nov. 17, 1987, incorporated herein by reference. Typical examples thereof are the Amano-P lipase, the lipase ex *Pseudomonas fragi* FERM P 1339 (available under the trade name Amano-B), lipase ex *Pseudomonas nitroreducens* var. *lipolyticum* FERM P 1338 (available under the trade name Amano-CES), lipases ex *Chromobacter viscosum,* e.g. *Chromobacter viscosum* var. *lipolyticum* NRRLB 3673, commercially available from Toyo Jozo Co., Tagata, Japan; and further *Chromobacter viscosum* lipases from U.S. Biochemical Corp., U.S.A. and Disoynth Co., The Netherlands, and lipases ex *Pseudomonas gladioli.* Peroxidase enzymes are used in combination with oxygen sources, e.g., percarbonate, perbonate, persulfate, hydrogen peroxide, etc. They are used for "solution bleaching" i.e. to prevent transfer of dyes of pigments removed from substrates during wash operations to other substrates in the wash solution. Perodidase enzymes are known in the art, and include, for example, horseradish peroxidase, ligninase, and haloperoxidase such as chloro- and bromo-peroxidase. Peroxidase-containing detergent compositions are disclosed, for example, in PCT International Application Wo 89/099813, published Oct. 19, 1989, by O. Kirk, assigned to Novo Industries A/S, incorporated herein by reference.

A wide range of enzyme materials and means for their incorporation into synthetic detergent granules is also disclosed in U.S. Pat. No. 3,553,139, issued Jan. 5, 1971 to McCarty et al. (incorporated herein by reference). Enzymes are further disclosed in U.S. Pat. No. 4,101,457, Place et al., issued Jul. 18, 1978, and in U.S. Pat. No. 4,507,219, Hughes, issued Mar. 26, 1985, both incorporated herein by reference. Enzyme materials useful for liquid detergent formulations, and their incorporation into such formulations, are disclosed in U.S. Pat. No. 4,261,868, Hora et al., issued Apr. 14, 1981, also incorporated herein by reference.

Enzymes are normally incorporated at levels sufficient to provide up to about 5 mg by weight, more typically about 0.5 mg to about 3 mg, of active enzyme per gram of the composition.

For granular detergents, the enzymes are preferably coated or prilled with additives inert toward the enzymes to minimize dust formation and improve storage stability. Techniques for accomplishing this are well known in the art. In liquid formulations, an enzyme stabilization system is preferably utilized. Enzyme stabilization techniques for aqueous detergent compositions are well known in the art. For example, one technique for enzyme stabilization in aqueous solutions involves the use of free calcium ions from sources such as calcium acetate, calcium formate, and calcium propionate. Calcium ions can be used in combination with short chain carboxylic acid salts, preferably formates. See, for example, U.S. Pat. No. 4,318,818, Letton et al., issued Mar. 9, 1982, incorporated herein by reference. It has also been proposed to use polyols like glycerol and sorbitol. Alkoxy-alcohols, dialkylglycoethers, mixtures of polyvalent alcohols with polyfunctional apiphatic amines 9 e.g., alkanolamines such as diethanolamine, triethanolamine, di-isopropanolamine, etc.), and boric acid or alkali metal borate. Enzyme stabilization techniques are additionally disclosed and exemplified in U.S. Pat. No. 4,261,868, issued Apr. 14, 1981 to Horn, et al., U.S. Pat. No. 3,600,319, issued Aug. 17, 1971 to Gedge, et al., both incorporated herein by reference, and European Patent Application Publication No. 0 199 405, Application No. 86200586.5, published Oct. 29, 1986, Venegas. Non-boric acid and borate stabilizers are preferred. Enzyme stabilization systems are also described, for example, in U.S. Pat. Nos. 4,261,868, 3,600,319 and 3,519,570.

Bleaching Compounds—Bleaching Agents and Bleach Activators

The detergent compositions of the present invention may contain bleaching agents or bleaching compositions containing bleaching agent and one or more bleach activators. When included, present bleaching compounds will typically comprise from about 1% to about 20%, more typically from about 1% to about 10%, of such detergent composition. In general, bleaching compounds are optional components in non-liquid formulations, e.g., granular detergents. If present, the amount of bleach activators will typically be from about 0.1% to about 60%, more typically from about 0.5% to about 40% of the bleaching compositions. The bleaching agents used herein can be any of the bleaching agents useful for detergent compositions in textile cleaning, hard surface cleaning, or other cleaning purposes that are now known or become known. These include oxygen bleaches as well as other bleaching agents. For wash conditions below about 50° C., especially below 40° C., it is preferred that the compositions hereof not contain borate or material which can form borate in situ (i.e. borate-forming material) under detergent storage or wash conditions. Thus it is preferred under these conditions that a non-borate, non-borate forming bleaching agent is used. Preferably, detergents to be used at these temperatures are substantially free of borate and borate-forming material. As used herein, "substantially free of borate and borate-forming material" shall mean that the composition contains not more than about 2% by weight of borate-containing and borate-forming material of any type, preferably, no more than 1%, more preferably 0%.

One category of bleaching agent that can be used encompasses percarboxylic acid bleaching agents and salts thereof, suitable examples of this class of agents include magnesium monoperoxy-phthalate hexahydrate, the magnesium salt of metachloroperbenzoic acid, 4-nonylamino-4-oxoperoxybutyric acid and diperoxydodecandeioic acid. Such bleaching agents are disclosed in U.S. Pat. No. 4,483,781, Hartman, issued Nov. 20, 1984, U.S. patent application Ser. No. 740,446, Burns et al., filed Jun. 3, 1985, European Patent Application 0,133,354, Banks et al., published Feb. 20, 1985, and U.S. Pat. No. 4,412,934, Chung et al., issued Nov. 1, 1983, all of which are incorporated by reference herein. Highly preferred bleaching agents also include 6-nonylamino-6-oxoperoxycaproic acid as described in U.S. Pat. No. 4,634,551, issued Jan. 6, 1987 to Burns, et al., incorporated herein by reference.

Peroxygen bleaching agents can also be used. Suitable peroxygen bleaching compounds include sodium carbonate peroxyhydrate, sodium pyrophosate peroxyhydrate, urea peroxyhydrate, sodium peroxide, and subject perbonate monohydrate and tetrahydrate.

Peroxygen bleaching agents are preferably combined with bleach activators, which lead to the in situ production in aqueous solution (i.e., during the washing process) of the peroxy acid corresponding to the bleach activator.

A wide range of bleach activators can be used, examples being disclosed in Spadini et al U.S. Pat. No. 4179390. Preferred bleach activators include tetraacetyl alkylene diamines, particularly tetraacetyl ethylene diamine (TAED) and tetraacetyl (TAGU).

wherein R is an alkyl group containing from about 1 to 18 carbon atoms wherein the longest linear alkyl chain extending from and including the carbonyl carbon contains from about 6 to about 10 carbon atoms and L is a leaving group, the conjugate acid of which has a $pK_a$ in the range of from 4 to about 13. These bleach activators are described in U.S. Pat. No. 4,915,854, issued Apr. 10, 1990 to Mao, et al., incorporated herein by reference, and U.S. Pat. No. 4,412,934, which was previously incorporated herein by reference. Bleaching agents other than oxygen bleaching agents are also known in the art and can be utilized herein. One type of non-oxygen bleaching agent of particular interest includes photo-activated bleaching agents such as sulfonated zinc and/or aluminum phthalocyanines. These materials can be deposited upon the substrate during the washing process. Upon irradiation with light, in the presence of oxygen, such as by hanging clothes out to dry in the daylight, the sulfonated zinc phthalocyanine is activated and, consequently, the substrate is bleached. Preferred zinc phthalocyanine and a photoactivated bleaching process are described in U.S. Pat. No. 4,033,718, issued Jul. 5, 1977 to Holcombe et al., incorporated herein by reference. Typically, detergent compositions will contain about 0.025% to about 1.25%, by weight, of sulfonated zinc phthalocyanine.

Polymeric Soil Release Agent

Any polmeric soil release agents known to those skilled in the art can be employed in the detergent compositions of the present invention. Polymeric soil release agents are characterized by having both hydrophilic segments, to hydrophilize the surface of hydrophobic fibers, such as polyester and nylon, and hydrophobic segments, to deposit upon hydrophobic fibers and remain adhered thereto through completion of washing and rinsing cycles and, thus, serve as an anchor for the hydrophilic segments. This can enable stains occurring subsequent to treatment with the soil release agent to be more easily cleaned in later washing procedures.

Polymeric soil release agents include cellulosic derivatives such as hydroxyether cellulosic polymers, copolymeric blocks of ethylene terephthalate or propylene terephthalate with polyethylene oxide or polyrropylene oxide terephthalate, and the like. Cellulosic derivatives that are functional as soil release agents are commerically available and include hydroxyethers of cellulose such as Methocel® (Dow). Cellulosic soil release agents also include those selected from the group consisting of $C_1$–$C_4$ alkyl and $C_4$ hydroxyalkyl cellulose such as methylcellulose, ethylcellulose, hydroxypropyl methycellulose, and hydroxybutyl methylcellulose. A variety of cellulose derivatives useful as soil release polymers are disclosed in U.S. Pat. No. 4,000,093, issued Dec. 28, 1976 to Nicol, et al., incorporated herein by reference.

Soil release agents characterized by poly(vinyl ester) hydrophobe segments include graft copolymers of poly(vinyl ester), e.g. $C_1$–$C_6$ vinyl esters, preferably poly(vinyl acetate) grafted onto polyalkylene oxide backbones, such as polyethylene oxide backbones. Such materials are known in the art and are described in European Patent Application 0 219 048, published Apr. 22, 1987 by Kud, et al. Suitable commercially available soil release agents of this kind include the Sokalan™ type of material, e.g., Sokalan™ HP-22, available from BASF (West Germany). One type of preferred soil release agent is a copolymer having random blocks of ethylene terephthalate and polyethylene oxide (PEO) terephthalate. More specifically, these polymers are comprised of repeating units of ethylene terephthalate and PEO terephthalate in a mole ratio of ethylene terephthalate units to PEO terephthalate units of from about 25:75 to about 35:65, said PEO terephthalate units containing polyethylene oxide having molecular weights of from about 300 to about 2000. The molecular weight of this polymeric soil release agent is in the range of from about 25,000 to about 55,000. See U.S. Pat. No. 3,959,230 to Hays, issued May 25, 1976, which is incorporated by reference. See also U.S. Pat. No. 3,893,929 to Basadur issued Jul. 8, 1975 (incorporated by reference) which discloses similar copolymers. Another preferred polymeric soil release agent is a polyester with repeat units of ethylene terephthalate units containing 10–15% by weight of ethylene terephthalate units together with 90–80% by weight of polyoxyethlyene terephthalate units, derived from a polyoxyethylene glycol of average molecular weight 300–5,000, and the mole ratio of ethylene terephthalate units to polyoxyethylene terephthalate units in the polymeric compound is between 2:1 and 6:1. Examples of this polymer include the commercially available material Zelcon® 5126 (from Dupont) and Milease® T (from ICI). These polymers and methods of their preparation are more fully described in U.S. Pat. No. 4,702,857, issued Oct. 27, 1987, to Gosselink, which is incorporated herein. Other suitable polymeric soil release agents include the ethyl or methyl-capped 1,2-propylene terephthalate-polyoxy- ethylene terephthalate polyesters of U.S. Pat. No. 4,711,730, issued Dec. 8, 1987, to Gosselink et al., the anionic end-capped oligomeric esters of U.S. Pat. No. 4,721,580, issued Jan. 26, 1988, to Gosselink, wherein the anionic end-caps comprise sulfo-polyethoxy groups derived from polyethylene glycol (PEG), the block polyester oligomeric compounds of U.S. Pat. No. 4,702,857, issued Oct. 27, 1987 to Gosselink, having polyethoxy endcaps of the formula X—$(OCH_2CH_2)_n$— wherein n is from 12 to about 43 and X is a $C_1$-$C_4$ alkyl, or preferably methyl, all of these patents being incorporated herein by reference.

Additional soil release polymers include soil release polymers of U.S. Pat. No. 4,877,896, issued Oct. 31, 1989 to Maldonado et al., which discloses anionic, especially sulfoaroyl, end-capped terephthalate esters, said patent being incorporated herein by reference. The terephthalate esters contain unsymmetrically substituted oxy-1,2-alkyleneoxy units. If utilized, soil release agents will generally comprise from about 0.01% to about 10.0%, by weight, of the detergent compositions herein, typically from about 0.1% to about 5%, preferably from about 0.2% to about 3.0%.

Oct. 31, 1989 to Maldonado et al. All of these patents are incorporated herein by reference. If utilized, soil release agents will generally comprise from about 0.01% to about 10.0%, by weight, of the detergent compositions herein, typically from about 0.1% to about 5%, preferably from about 0.2% to about 3.0%.

Chelating Agents

The detergent compositions herein may also optionally contain one or more iron and manganese chelating agents as a builder adjunct material. Such chelating agents can be selected from the group consisting of amino carboxylates, amino phosphonates, polyfunctionally-substituted aromatic chelating agents and mixtures thereof, all as hereinafter defined. Without intending to be bound by theory, it is believed that the benefit of these materials is due in part to their exceptional ability to remove iron and manganese ions from washing solutions by formation of soluble chelates.

Amino carboxylates useful as optional chelating agents in compositions of the invention can have one or more, preferably at least two, units of the substructure

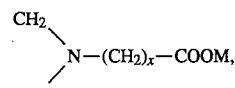

wherein M is hydrogen, alkali metal, ammonium or substituted ammonium (e.g. ethanolamine) and x is from 1 to about 3, preferably 1. Preferably, these amino carboxylates do not contain alkyl or alkenyl groups with more than about 6 carbon atoms. Operable amine carboxylates include ethylenediaminetetraacetates, N-hydroxyethylethylenediaminetriacetates, nitrilotriacetates, ethylenediamine tetrapropionates, triethyl enetetraaminehexa-acetates, diethylenetriaminepentaacetates, and ethanoldiglycines, alkali metal, ammonium, and substituted ammonium sales thereof and mixtures thereof.

Amino phosphonates are also suitable for use as chelating agents in the detergent compositions of the invention when at lease low levels of total phosphorus are permitted in detergent compositions. Compounds with one or more, preferably at least two, units of the substructure

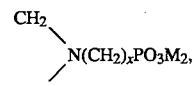

wherein M is hydrogen, alkali metal, ammonium or substituted ammonium and x is from 1 to about 3, preferably 1, are useful and include ethylenediaminetetrakis (methylenephosphonates), nitrilotris (methylenephosphonates) and diethylenetriaminepentakis (methylenephosphonates). Preferably, these amino phosphonates do not contain alkyl or alkenyl groups with more than about 6 carbon atoms. Alkylene groups can be shared by substructures.

Polyfunctionally—substituted aromatic chelating agents are also useful in the compositions herein. These materials can comprise compounds having general formula

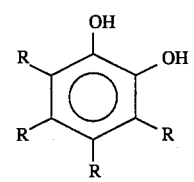

wherein at least one R is —$SO_3H$ or —COOH or soluble salts thereof and mixtures thereof. U.S. Pat. No. 3,812,044, issued May 21, 1974, to Connor et al., incorporated herein by reference, discloses polyfunctionally—substituted aromatic chelating and sequestering agents. Preferred compounds of this type in acid form are dihydroxydisulfobenzenes such as 1,2-dihydroxy-3,5-disulfo-benzene. Alkaline detergent compositions can contain these materials in the form of alkali metal, ammonium or substituted ammonium (e.g. mono-or triethanol-amine) salts. If utilized, these chelating agents will generally comprise from about 0.1% to about 10% by weight of the detergent compositions herein. More preferably chelating agents will comprise from about 0.1% to about 3.0% by weight of such compositions.

Clay Soil Removal/Anti-redeposition Agents

Clay soil removal/anti-redeposition agents useful in the detergent compositions of the present invention include polyethylene glycols and water-soluble ethoxylated amines having clay soil removal and anti-redeposition properties, as well as additional polyamino compounds derived from aspattic acid but not containing glutamic acid.

Polyethylene glycol compounds useful in the detergent compositions of the present invention typically have a molecular weight in the range of from to about 1,000 to about 20,000, more preferably from about 2,000 to about 12,000, most preferably from about 4,000 to about 8,000. Such compounds are commercially available and are sold as Carbowax@, which is available from Union Carbide, located in Danbury, Conn. The water soluble ethoxylated amines are preferably selected from the group consisting of:

(1) ethoxylated monamines having the formula:

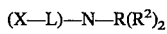

(2) ethoxylated diamines having the formula:

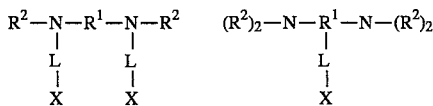

or

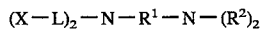

(3) ethoxylated polyamines having the formula:

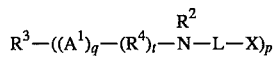

(4) ethoxylated amine polymers having the general formula:

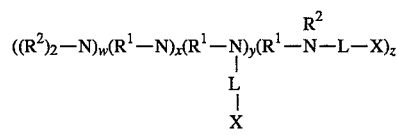

and (5) mixtures thereof; wherein $A^1$ is:

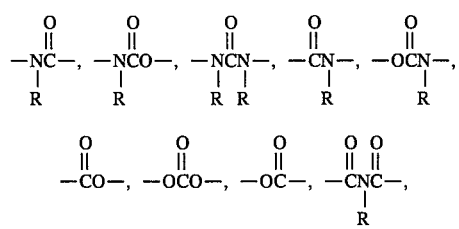

or —O—; R is H or $C_1$–$C_4$ alkyl or hydroxyalkyl $R^1$ is $C_2$–$C_{12}$ alkylene, hydroxyalkylene, alkenylene, arylene or alkarylene, or a $C_2$–$C_3$ oxyalkylene moiety having from 2 to about 20 oxyalkylene units provided that no O—N bonds are formed; each $R^2$ is $C_1$–$C_4$ or hydroxyalkyl, the moiety —L—X, or two $R^2$ together form the moiety —$(CH_2)_r$—, —$A^2$—$(CH_2)_s$—, wherein $A^2$ is —O— or —$CH_2$—, r is 1 or 2, s is 1 or 2, and r+s is 3 or 4; X is a nonionic group, an anionic group or mixture thereof; $R^3$ is a substituted $C_3$–$C_{12}$ alkyl, hydroxyalkyl, alkenyl, aryl, or alkaryl group having substitution sites; $R^4$ is $C_1$–$C_{12}$ alkylene, hydroxyakylene, alkenylene, arylene or alkarylene, or a $C_2$–$C_3$ oxyalkylene moiety having from 2 to about 20 oxyalkylene units provided that no O—O or O—N bonds are formed; L is a hydrophilic chain which contains the polyoxyalkylene moiety —$((R^5O)_m(CH_2CH_2O)_n)$—, wherein $R^5$ is $C_3$–$C_4$ alkylene or hydroxyalkylene and m and n are numbers such that the moiety —$CH_2CH_2O)_n$— comprises at least about 50% by weight of said polyoxyalkylene moiety; for said monamines, m is from 0 to about 3, and n is at least about 6 when $R^1$ is $C_2$–$C_3$ alkylene, hydroxyalkylene, or alkenylene, and at least about 3 when $R^1$ is other than $C_2$–$C_3$ alkylene, hydroyalkylene or alkenylene; for said polyamines and amine polymers, m is from 0 to about 10 and n is at least about 3; p is from 3 to 8; q is 1 or 0; t is 1 or 0, provided that t is 1 when q is 1; w is 1 or 0; x+y+z at least 2; and y+z is at least 2.

The most preferred soil release and anti-redeposition agent are ethoxylated tetraethylenepentamine. Exemplary ethoxylated amines are further described in U.S. Pat. No. 4,597,898, VanderMeer, issued Jul. 1, 1986, incorporated herein by reference. Another group of preferred clay soil removal/anti-redeposition agents are the cationic compounds disclosed in European Patent Application 111,965, Oh and Gosselink, published Jun. 27, 1984, incorporated herein by reference. Other clay soil removal/anti-redeposition agents which can be used include the ethoxylated amine polymers disclosed in European Patent Application 111,984, Gosselink, published Jun. 27, 1984; the zwitterionic polymers disclosed in European Patent Application 112,592, Gosselink, published Jul. 4, 1984; and the amine oxides disclosed in U.S. Pat. No. 4,548,744, Connor, issued Oct. 22, 1985, all of which are incorporated herein by reference.

The most preferred soil release and anti-deposition agents are ethoxylated tetraethylenepentamine and the polythylene glycols having a molecular weight in the range of from about 4,000 to about 8,000.

Granular detergent compositions which contain such compounds typically contain from about 0.01% to about 10.0% by weight of the clay removal agent.

Polymeric Dispersing Agent

Polymeric polycarboxylate dispersing agents can advantageously be utilized in the detergent compositions of the present invention. These materials can aid in calcium and magnesium hardness control. In addition to acting as a builder adjunct analogously to the polycarboxylate described above in the Builder description, it is believed, though it is not intended to be limited by theory, that these higher molecular weight dispersing agents can further enhance overall detergent builder performance by inhibiting crystal growth of inorganics, by particulate soil peptization, and by antiredeposition, when used in combination with other builders including lower molecular weight polycarboxylates. The polycarboxylate materials which can be employed as the polymeric polycarboxylate dispersing agent are these polymers or copolymers which contain at least about 60% by weight of segments with the general formula:

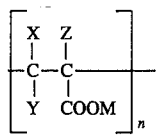

wherein X, Y, and Z are each selected from the group consisting of hydrogen, methyl, carboxy, carboxymethyl, hydroxy and hydroxymethyl; a salt forming cation and n is from about 30 to about 400. Preferably, X si hydrogen or hydroxy, Y is hydrogent or carboxy, Z is hydrogen and M is hydrogen, alkali metal, ammonia or substituted ammonium.

Polymeric polycarboxylate materials of this type can be prepared by polymerizing or copolymerizing suitable unsaturated monomers, preferably in their acid form. Unsaturated monomeric acids that can be polymerized to form suitable polymeric polycarboxylates include acrylic acid, maleic acid (or maleic anhydride), fumaric acid, iraconic acid, aconitic acid, mesaconic acid, citraconic acid and methylenemalonic acid. The presence in the polymeric polycarboxylates herein of monomeric segments, containing no carboxylate radicals such as vinylmethyl ether, styrene, ethylene, etc. is suitable provided that such segments do not constitute more than about 40% by weight.

Particularly suitable polymeric polycarboxylates can be derived from acrylic acid. Such acrylic acid-based polymers which are useful herein are the water soluble salts of polymerized acrylic acid. The average molecular weight of such polymers in the acid form ranges from about 2,000 to 10,000, more preferably from about 4,000 to 7,000 and most preferably from about 4,000 to 5,000. Water soluble salts of such acrylic acid polymers can include, for example, the alkali metal, ammonium and substituted ammonium salts. Soluble polymers of this type are known materials. Use of polyacrylates of this type in detergent compositions have been disclosed, for example, in Diehl, U.S. Pat. No. 3,308, 067, issued Mar. 7, 1967. This patent is incorporated herein by reference.

Acrylic/maleic-based copolymers may also be used as a preferred component of the dispersing agent. Such materials include the water soluble salts of copolymers of acrylic acid and maleic acid. The average molecular weight of such copolymers in the acid form ranges from about 5,000 to 100,000, preferably from about 6,000 to 60,000, more preferably from about 7,000 to 60,000. The ratio of acrylate to maleate segments in such copolymers will generally range from about 30:1 to about 1:1, more preferably from about 10:1 to 2:1. Water-soluble salts of such acrylic acid/maleic acid copolymers can include, for example, the alkali metal, ammonium and substituted ammonium salts. Soluble acrylate/maleate copolymers of this type are known materials which are described in European Patent Application No. 66915, published Dec. 15, 1982, which publication is incorporated herein by reference.

Polyamino dispersant compounds derived from aspartic acid but not containing glutamic acid are useful as additional polyamino disperant compounds in the detergent compositions of the invention. Such polyamino dispersant compounds suitable for inclusion herein are disclosed in EP-A-305282, EP-A-305283 and EP-A-351629.

If utilized, the polymeric dispersing agents will generally comprise from about 0.2% to about 10%, preferably form about 1% to about 5% by weight of the laundry detergent compositions.

Brightener

Optical brighteners or other brightening or whitening agents known to those skilled in the art can be incorporated into the laundry detergent compositions of the present invention. However, the choice of brightener will depend upon a number of factors, such as the type of detergent, the nature of other components present in the detergent composition, the temperatures of wahs wash, the degree of agitation, and the ratio of the material washed to tub size.

The brightener selection is also dependent upon the type of material to be cleaned, e.g. cottons, synthetics, etc. Since most laundry detergent products are used to clean a variety of fabrics, the detergent compositions should contain a mixture of brighteners which will be effective for a variety of fabrics. It is of course necessary that the individual components of such a brightener mixture be compatible.

Commercial optical brighteners can be classified into subgroups which include, but are not necessarily limited to, derivatives of stilbene, pyrazoline, coumarin, carboxylic acid, methine cyanines, dibenzothiphene-5,5-dioxide, azoles, 5- and 6-membered-ring heterocycles, and other miscellaneous agents. Examples of such brighteners are disclosed in "The Production and Application of Fluorescent Brightening Agents", M. Zahradnik, Published Dy John Wiley & Sons, New York (1982), the disclosure of which is incorporated herein by reference.

Stilbene derivatives include, but are not necessarily limited to, derivatives of stilbene; triazole derivatives of stilbene; oxadiazole derivatives of stilbene; oxazole derivatives of stilbene; and stryl of stilbene.

Certain derivatives of bis(triazinly) aminostilbene may be prepared from 4,4'-diamine-stilbene-2,2'-disulfonic acid.

Coumarin derivatives include, but are not necessarily limited to, derivatives substituted in the 3-position, in the 7-position, and in the 3- and 7-positions. Carboxylic acid derivatives include, but are not necessarily limited to, fumaric acid derivatives; benzoic acid derivatives; p-phenylene-bis-acrylic acid derivatives; naphthalenedicarboxylic acid derivatives; heterocyclic acid derivatives; and cinnamic acid derivatives.

Cinnamic acid derivatives can be further subclassified into groups which include, but are not necessarily limited to, cinnamic acid derivatives, styrylazoles, styrylbenzofurans, styryloxadiazoles, styryltriazoles, and styrylpolyphenyls, as disclosed on page 77 of the Zahradnik reference.

The styrylazoles can be further subclassified into styrylbenzoxazoles, styrylimidazoles and styrylthiazoles, as disclosed on page 78 of the Zahradnik reference. It will be understood that these three identified subclasses may not necessarily reflect an exhaustive list of subgroups into which styrylazoles may be subclassified.

Other optical brighteners are the derivatives of dibenzothiophene-5,5-dioxide disclosed at page 741–749 of *The Kirk-Othmer Encyclopedia of Chemical Technology*, Volume 3, pages 737–750 (John Wiley & Son, Inc., 1962), the disclosure of which is incorporated herein by reference, and include 3,7-daiminodibenzothiophene-2, 8-disulfonic acid5, 5 dioxide.

Other optical brighteners are azoles, which are derivatives of 5-membered ring heterocycles. These can be further subcategorized into monoazoles and bisazoles. Examples of monazoles and bisazoles are disclosed in the Kirk-Othmer reference.

Examples of such compounds include brighteners derived from pyrazine and brighteners derived from 4-aminonaphthalamide.

In addition to the brighteners already described, miscellaneous agents may also be useful as brighteners. Examples of such miscellaneous agents are disclosed at pages 93–95 of the Zanradnik reference, and include 1-hydroxy-3,6,8-pyrenetrisulfonic acid; 2,4-dimethoxy-1,3,5-triazin-6-yl-pyrene; 4,5-diphenylimidazolonedisulfonic acid; and derivatives of pyrazolinequinoline.

Other specific examples of optical brightener are those identified in U.S. Pat. No. 4,790,856, issued to Wixon on Dec. 13, 1988, the disclosure of which is incorporated herein by reference. These brighteners include the Phorwhite™ series of brighteners from Verona. Others brighteners disclosed in this reference include: Tinopal UNPA, Tinopal CBS and Tinopal 5BM; available from Ciba-Geigy; Artic White CC and Artic White CWD, available from Hilton-Davis, located in Italy; the 2-(4-styrylphenyl)-2H-naphthol(1,2-d)triazoles; 4,4'-bis-(1,2,3-triazol-2-yl)-stilbene; 4,4'-bis(styryl)bisphenyls; and the y-amino-coumarins. Specific examples of these brighteners include 4-methyl-7-diethylamino coumarin; 1,2-bis(-bensimidazol-2-yl)-ethylene; 1,3-diphenylphrazolines; 2,5-bis(benzoxazol-2-yl)-thiophene; 2-styryl-naphth-(1,2-d)-oxazole; and 2-(stilbene-4-yl)-2H-naphtho(1,2d)triazole.

Still other optical brighteners include those disclosed in U.S. Pat. No. 3,646,015, issued Feb. 29, 1972 to Hamilton, the disclosure of which is incorporated herein by reference.

If utilized, the optical brighteners will generally comprise from about 0.05% to about 2.0%, preferably from about 0.1% to about 1.0% by weight of the laundry detergent compositions.

Suds Suppressors

Compounds known, or which become known, for reducing or suppressing the formation of suds can be incorporated into the detergent compositions of the present invention. The incorporation of such materials, hereafter "suds suppressor", can be desirable because the polyhydroxy fatty acid amide surfactants hereof can increase suds stability of the detergent compositions. Suds suppression can be of particular importance when the detergent compositions include a relatively high sudsing surfactant in combination with the polyhydroxy fatty acid amide surfactant.

Suds suppression is particularly desirable for compositions intended for use in front loading automatic washing machines. These machines are typically characterized by having drums, for containing the laundry and wash water, which have a horizontal axis and rotary action about the axis. This type of agitation can result in high suds formation and, consequently, in reduced cleaning performance. The use of suds suppressors can also be of particular importance under hot water washing conditions and under high surfactant concentration conditions.

A wide variety of materials may be used as suds suppressors. Suds suppressors are well known to those skilled in the art. They are generally described, for example, in Kirk Othmer Encyclopedia of Chemical Technology, Third Edition, Volume 7, pages 430–447 (John Wiley & Sons, Inc., 1979). One category of suds suppressor of particular interest encompasses monocarboxylic fatty acids and soluble salts thereof. These materials are discussed in U.S. Pat. No. 2,954,347, issued Sep. 27, 1960 to Wayne St. John, said patent being incorporated herein by reference. The monocarboxylic fatty acids, and salts thereof, for use as suds suppressors typically have hydrocarbyl chains of 10 to about 24 carbon atoms, preferably 12 to 18 carbon atoms. Suitable salts include alkali metal salts such as sodium, potassium, and lithium salts, and ammonium and alkanolammonium salts. These materials are a preferred category of suds suppressor for detergent compositions.

The detergent compositions of the present invention may also contain non-surfactant suds suppressors. These include, for example, high molecular weight hydrocarbons such as paraffin, fatty acid esters (e.g., fatty acid triglycerides), fatty acid esters of monovalent alcohols, aliphatic $C_{18}$–$C_{40}$ ketones (e.g. stearone), etc. Other suds inhibitors include N-alkylated amino triazines such as tri- to hexaalkylemlamines or di- to tetra-alkyldiamine chlortriazines formed as products of cyanuric chloride with two or three moles of a primary or secondary amine containing 1 to 24 carbon atoms, propylene oxide, and monostearyl phosphates such as monostearyl alcohol phosphate ester and monostearyl di-alkali metal (e.g., sodium, potassium, lithium) phosphates and phosphate esters. The hydrocarbons, such as paraffin and haloparaffin, can be utilized in liquid form. The liquid hydrocarbons will be liquid at room temperature and atmospheric pressure, and will have a pour point in the range of about –40° C. and about 5° C., and a minimum boiling point not less than about 100° C. (atmospheric pressure). It is also known to utilize waxy hydrocarbons, preferably having a melting point below about 100° C. The hydrocarbons constitute a preferred category of suds suppressor for detergent compositions. Hydrocarbon suds suppressors are described for example in U.S. Pat. No. 4,265,779, issued May 5, 1981 to Gandolfo et al., incorporated herein by reference. The hydrocarbons, thus, include aliphatic, alicyclic, aromatic, and heterocyclic saturated or unsaturated hydrocarbons having from about 12 to about 70 carbon atoms. The term "parrafin" as used in this suds suppressor discussion, is intended to include mixtures of true paraffins and cyclic hydrocarbons.

Another preferred category of non-surfactant suds comprises silicone suds suppressors. This category includes the use of polyorganosiloxane oils, such as polydimethysiloxane, dispersions or emulsions of polyorganosiloxane oils or resins, and combinations of polyorganosiloxane with silica particles wherein the polyorganosiloxane is chemisorbed of fused onto the silica. Silicone suds suppressors are well known in the art and are, for example disclosed in U.S. Pat. No. 4,265,779, issued May 5, 1981 to Gandolfo et al., and European Patent Application No. 89307851.9, published Feb. 7, 1990, by Starch, M. S., both incorporated herein by reference.

Other silicone suds suppressors are disclosed in U.S. Pat. No. 3,455,839, which relates to compositions and processes for defoaming aqueous solutions by incorporating therein small amounts of polydimethylsiloxane fluids.

Mixtures of silicone and silanated silica are described, for instance, in German Patent Application DOS 2,124,526. Silicone defoamers and suds controlling agents in granular detergent compositions are disclosed in U.S. Pat. No. 3,933,672, Bartolotta et al., and in U.S. Pat. No. 4,652,392, Baginski et al., issued Mar. 24, 1987.

An exemplary silicone based suds suppressor for use herein is a suds suppressing amount of a suds controlling agent consisting essentially of:

(i) Polydimethylsiloxane fluid having a viscosity of from about 20 cs. to about 1500 cs. at 25° C.;

(ii) From about 5 to about 50 parts per 100 parts by weight of:

(i) of siloxane resin composed of $(CH_3)_3$ $SiO_{1/2}$ units of $S_iO_2$ units in a ratio of from $(CH_3)_3SiO_{1/2}$ units and to $SiO_2$ units of from about 0.6:1 to about 1.2:1; and (iii) from about 1 to about 20 parts per 100 parts by weight of:

(i) of a solid silica gel:

Suds suppressors, when utilized, are present in a "suds suppressing amoung". By "suds suppressing amount" is meant that he formulator of the composition can select an amount of this suds controlling agent that will control the suds to the extent desired. The amount of suds control will vary with the detergent surfactant selected. For example, with high sudsing surfactants, relatively more of the suds controlling agent is used to achieve the desired suds control than with low foaming surfactants.

The detergent compositions of the present invention will generally comprise from 0% to about 5% of suds suppressor. When utilized as suds suppressors, monocarboxylic fatty acids, and salts thereof, will be present typically in amounts up to about 5%, by weight, of the detergent composition. Preferably, from about 0.5% to about 3% of fatty monocarboxylate suds suppressor is utilized. Silicone suds suppressors are typically utilized in amounts up to about 2.0%, by weight, of the detergent composition, although higher amounts may be used. This upper limit is practical in nature, due primarily to concern with keeping costs minimized and effectiveness of lower amounts for effectively controlling sudsing. Preferably from about 0.01% to about 1% of silicone suds suppressor is used, more preferably from about 0.25% to about 0.5%. As used herein, these weight percentage values include any silica that may be utilized in combination with polyorganosiloxane, as well as any adjunct materials that may be utilized. Monostearyl phosphates are generally utilized in amounts ranging from about 0.1% to about 2% by weight of the compositions.

Hydrocarbon suds suppressors are typically utilized in amounts ranging from about 0.01% to about 5.0%, although higher levels can be used.

Other Ingredients

A wide variety of other ingredients which can be included in the detergent compositions of the present invention include other active ingredients, carriers, hydrotropes, processing aids, dyes or pigments, solvents for liquid formulations, etc.

Liquid detergent compositions can contain water and other solvents as carriers. Low molecular weight primary or secondary alcohols exemplified by methanol, ethanol, propanol, and isopropanol are suitable. Monohydric alcohols are preferred for solubilizing surfactant, but polyols such as those containing from 2 to about 6 carbon atoms and from 2 to about 6 hydroxy groups (e.g., propylene glycol, ethylene glycol, glycerine, and 1,3-propanediol) can also be used. The detergent compositions of the present invention will preferably be formulated such that during use in aqueous cleaning operations, the wash water will have a pH of between about 6.5 and about 11, preferably between about 7.5 and about 10.5. Liquid product formulations preferably have a pH between about 7.5 and about 9.5, more preferably between about 7.5 and about 9.0. Techniques for controlling pH at recommended usage levels include the use of buffers, alkali, acids, etc., and are well known to those skilled in the art. In laundry use, the composition of the present invention will be dissolved or dispersed in an aqueous medium, typically tapy water, and the fabric to be cleaned will be immersed in the resultant washing liquor, with agitation if appropriate. The compositions can be used for soaking, for washing by hand or in automatic laundry washing machines. The concentration of actives in the said liquor, the temperature, the degree of agitation and the duration of the immersion may be varied, depending upon the nature of the fabric and the amount of soiling.

In addition to their use as dispersants, the polymers of glutamic acid may also be used as chelating agents, e.g. for ions of such metals as copper; as soil-release agents (especially when carrying hydrophobic substituents); and as dye-transfer inhibitors. The use of the said polymers in combination with conventional dispersants including dispersants derived from aspartic acid but not containing glutamic acid, is not precluded. The present invention is not illustrated in and by the following examples.

EXAMPLE 1

A 150 ml conical flask was flame-dried in argon and provided with a thermometer, magnetic stirrer, reflux condenser and argon blanket via a Noramg bubbler. The flask was than charged with 2.50 g f L-glutamic acid (from Messrs. BDH) and 100 ml of dried tetrahydrofuran (THF). The resultant mixture was then heated to 65° C. and 2.46 g of disphogene (trichloromethycholoroformate, from Messrs Fluka), were then added over a period of 9 minutes. There was visual evidence of gas evolution during the addition. The resultant mixture was then held at 65° C. for 3 hours, during which time virtually all of the solid dissolved. After cooling, the mixture was gravity filtered under argon and the solid washed with THF and dried in vacuo. The solid residue (0.08 g) was thought to be composed largely of unreacted starting material. The resultant filtrate was rotary evaporated (at a maximum bath temperature of 40° C.), to leave a pale yellow oil (4.78 g). This was slurried in 19 ml ethyl acetate whereupon a white solid crystallized. Then 60 ml of 40°–60° C. petroleum ether were added under argon over 15 minutes and the white solid was then gravity filtered under argon, washed with petroleum ether and dried in vacuo. This yielded 2.42 g (yield=82.3%) of the N-carboxyanhydride of L-glutamic acid, probably in the a form. A 250 ml conical flask provided with a magnetic stirrer and an argon blanket was charged with 0.87 g of the N-carboxyanhydride of L-glutamic acid (prepared as described in the preceding paragraph), 174 ml of dried acetonitrile and 0.31 g of sodium methoxide (from Messrs. Aldrich). The mixture was stirred at room temperature (approx. 20° C.) for 24 hours and then about 4 g of solid carbon dioxide were added (to destroy excess base). After stirring for a further 30 minutes, the mixture was gravity filtered under argon and the solid was washed with acetonitrile and dried in vacuo to yield 0.84 g of poly(1-glutamic acid) in the form of a hygroscipic, glassy white solid.

EXAMPLE 2

A standard granular laundry detergent composition was prepared as follows, where the components are given on a percentage weight basis.

| | |
|---|---|
| LAS | 7.71 |
| TAS | 2.43 |
| TAE11 | 1.10 |
| 25E3 | 3.26 |
| ZEOLITE A | 19.5 |
| CITRATE | 6.5 |
| CARBONATE | 11.14 |
| PERBONATE | 16.0 |
| TAED | 5.0 |
| DETPMP | 0.38 |
| CMC | 0.48 |

-continued

| | | |
|---|---|---|
| SUDS SUPPRESOR | | 0.5 |
| BRIGHTENER | | 0.24 |
| PHOTOACTIVATED BLEACH | | 0.002 |
| ENZYME | | 1.4 |
| SILICATE (2.0 RATIO) | | 4.38 |
| MGSO4 | | 0.43 |
| PERFUME | | 0.43 |
| SULPHATE | | 4.10 |

Water and miscellaneous to balance

In the standard granular laundry detergent composition, the abbreviated component identifications have the following meanings:

| | |
|---|---|
| LAS | Sodium linear $C_{12}$ alkyl benezene sulphonate |
| TAS | Sodium tallow alkyl sulphate |
| $TAE_n$ | Tallow alcohol ethoxylated with n moles of ethylene oxide per mole of alcohol |
| 25EY | A $C_{12-15}$ predominantly linear primary alcohol condensed with an average of Y moles of ethylene oxide |
| TAED | Tetraacetyl ethylene diamine |
| Silicate | Amorphous Sodium Silicate ($SiO_2$ $Na_2O$ ratio normally follows) |
| Carbonate | Anhydrous sodium carbonate |
| CMC | Sodium carboxymethyl cellulose |
| Zeolite A | Hydrated Sodium Aluminosilicate of formula $Na_{12}(AlO_2SiO_2O$ having a primary particle size in the range from 1 to 10 micrometers |
| Citrate | Tri-sodium citrate dehydrate. |
| Photoactivated Bleach | Tetra sulphonated Zinc phthalocyanine. |
| Perbonate | Anhydrous sodium perbonate monohydrate bleach, empirical formula $NaBO_2.H_2O_2$. |
| Enzyme | Mixed proteolytic and amylolytic enzyme sold by Novo Industries AS. |
| Brightener | Disodium 4,4'-bis(2-morpholino-4 anilino-s-triazin-6-ylamino) stilbene-2:2'-disulphonate. |
| DETPMP | Diethylene-triamine penta (methylene phosphonic acid), marketed by Monsanto under the Trade name Dequest 2060. |
| Suds Suppressor | 25% paraffin wax Mpt 50° C., 17% hydrophobic silica, 58% paraffin oil. |
| Sulphate | Anhydrous sodium sulphate |

A test composition according to the present invention was prepared by adding poly(L-glutamic acid), prepared according to the method of Example 1, to the standard, granular laundry detergent composition as described above, containing both nonionic and anionic surfactants but containing no polycarboxylate soil suspending agent. The poly (L-glumatic acid) was added in an amount of 4.25% by weight of the standard composition. A comparison composition was provided by a standard, granular laundry detergent composition containing 4.25% by weight of a conventional polycarboxylate soil-suspending/anti-redeposition agent, comprising a copolymer of 1:4, maleic/acrylic acid with an average molecular weight of about 80,000.

Stained cotton tea towels were prepared by taking a cotton tea towel and painting on a set of tea stain. Stained polycotton test swatches were also prepared by painting stains on to 10 cm * 10 cm samples of polycotton fabric.

The stained polycotton test swatches and cotton tea towels were washed at 60° C. in water of 25° hardness (Ca:Mg=3:1) in an AEG washing machine together with a ballast olad fo 2.5–3 kg of naturally soiled polycotton and polyester garments, using the aforesaid compositions. Tests were carried out on the stains recorded below.

The effectiveness of the compositions in cleaning and stain removal were judged by an expert panel of four judges, the results being recorded in panel score units (psu) using the Scheffe scale, taking the results obtained using the comparison formulation as the standard (0.00) in each test. The results are given in the following table:

TABLE 1

| Test | Composition with PGA |
|---|---|
| Stain Removal: | |
| Enzymatic | 0.29 |
| Greasy | 0.72* |
| Lipstick | 0.69 |
| DMO | 1.94* |
| P. Greasy | 0.25 |
| P. Make-up | 0.56 |
| P. DMO | 0.25 |
| Bleachable | 0.39 |
| Clay 1 | –1.06 |
| Clay 2 | 1.38* |
| Clay 3 | 0.25 |
| Clay 4 | 0.00 |
| Clay 5 | 0.69 |
| Clay 6 | 0.38 |
| Clay 7 | 0.50 |

NOTES
*= result that was stasticially significant
p = polycoton test fabric
PGA = Poly (L-glumatic acid)
DMO = Dirty Motor oil
Clays 1–7 = Different clays from a variety of U.K. and European sites.

The above results show that the primary wash performance of the PGA-containing composition was at least comparable to that of the test formulation containing the conventional soil-suspending/anti-redesposition agent in the important area of particulate stain removal and provided the added benefit that the PGA is more readily biodegradable than the conventional agent.

EXAMPLE 3

The effectiveness of a composition according to the present invention was tested by washing cotton cloth containing particulate stains (black iron oxide) under ambient conditions in municipal water (12°–17° H.) for 3 minutes in a washing machine. Four replicates were carried out and the washed cloth was examined with a Hunter colour meter to give a total of 16 readings per cloth, which were then averaged to provide an average L value (L=95+ denotes whiteness, L=0 denotes black). The individual L values were taken across the surface of the cloth.

The composition according to the present invention Was prepared by adding poly(L=glumatic acid) to a standard detergent formulation, as described in Example 2. The formulation according to the present invention is designated (a) in the table of results hereinafter. Comparison tests were carried out using the above-described procedure (b) in the absence of any detergent formulation of soil-suspending/anti-redeposition agent, or in the presence of (c) a standard detergent formulation containing no polycarboxylate soil-suspending/anti-redeposition agent, (d) the standard detergent formulation to which a conventional polycarboxylate soil-suspending/anti-redeposition agent had been added at a level of 4.25% by weight. The results are shown in the following table, wherein the higher the value for L, the whiter the washed fabric.

TABLE 2

| Formulation | L |
|---|---|
| (a) | 65.8 |
| (b) | 51.6 |
| (c) | 56.6 |
| (d) | 57.7 |
| (e) | 70.4 |

EXAMPLE 4

A test composition and a comparison composition were prepared as described in Example 2. Naturally soiled wash loads of weight 2.5–3 kg were washed at 60° C. in water of 24° H. in a washing machine using three compositions. Whiteness tracer fabrics (vest and terry cotton material) were added to each load and single and multiple washings of the fabrics were carried out. The effectiveness of the compositions in whiteness maintenance was judged by an expert panel of four judges, the results being recorded in psu using the Scheffe scale, taking the results obtained using the comparison formulation as the standard (0.00) in each test. The results are given in the following table:

TABLE 3

| Whiteness | Composition with PGA |
|---|---|
| Single cycle | 0.44 |
| Four cycle | 0.09 |

The results indicate that the composition according to the present invention achieves at least parity in net performance with the comparison composition.

EXAMPLE 5

Naturally soiled garments of total weight 2.5 to 3 kg were washed using the compositions and the washing conditions described in Example 2 and the results were assessed in psu using the evaluation method described in that example. The results are given in the following table:

TABLE 4

| Soiled Garment | Composition Containing PGA |
|---|---|
| Terry towelling | 0.14 |
| Tea towelling | 0.87 |
| Roller towelling | 0.28 |
| Mixed cotton shirt material | 0.79 |

These results indicate that the composition of the present invention, in overall cleaning performance, achieved at least parity with the comparison composition.

It will of course be understood that the present invention has been described above purely by way of example and that modifications of detail can be made within the scope of the invention.

What is claimed is:

1. A cleaning composition comprising (a) from about 0.1 to 15% by weight of a block copolymer comprising biodegradable polyethylene glycol and poly (1-glutamic acid); and (b) a detersive surfactant.

2. A composition according to claim 1 wherein the detersive surfactant component (b) is selected from the group consisting of nonionic, anionic, cationic, ampholytic, and zwitterionic surfactants, and mixtures thereof.

3. A composition according to claims 1 or 2 incorporating from 0.2% to 10% by weight of additional polyamino dispersant compound, wherein the additional polyamino dispersants compound is derived from aspartic acid and does not contain glutamic acid.

* * * * *